US009764875B2

(12) United States Patent
Stanek et al.

(10) Patent No.: US 9,764,875 B2
(45) Date of Patent: *Sep. 19, 2017

(54) METHODS FOR PROTECTING A GROUND SURFACE FROM EXPOSURE TO MATERIAL THAT MAY BE SPILLED FROM OR LEAK FROM ONE OR MORE CONTAINERS

(71) Applicant: ENPAC, L.L.C., Eastlake, OH (US)

(72) Inventors: Lawrence Stanek, Akron, OH (US); Jay Wiley, Mentor, OH (US); Robert Heintz, Chardon, OH (US); Scott Janda, Chagrin Falls, OH (US); Timothy Reed, Northfield Center, OH (US)

(73) Assignee: ENPAC, L.L.C., Eastlake, OH (US)

( * ) Notice: Subject to any disclaimer, the term of this patent is extended or adjusted under 35 U.S.C. 154(b) by 132 days.

This patent is subject to a terminal disclaimer.

(21) Appl. No.: 14/856,821

(22) Filed: Sep. 17, 2015

(65) Prior Publication Data

US 2016/0001920 A1 Jan. 7, 2016

Related U.S. Application Data

(63) Continuation of application No. 14/380,357, filed as application No. PCT/US2013/027026 on Feb. 21, 2013, now Pat. No. 9,150,350.

(Continued)

(51) Int. Cl.
*B65D 19/44* (2006.01)
*B65D 19/06* (2006.01)
(Continued)

(52) U.S. Cl.
CPC ............. *B65D 19/06* (2013.01); *B65D 90/24* (2013.01); *F16N 31/006* (2013.01);
(Continued)

(58) Field of Classification Search
CPC ........ B65D 19/44; B65D 90/24; B65D 15/24; B65D 37/00; B65D 33/02; F16N 31/00; F16N 31/006
(Continued)

(56) References Cited

U.S. PATENT DOCUMENTS 4,182,386 A * 1/1980 Alack .................. B65G 69/182
108/55.1
4,206,846 A * 6/1980 Connolly .............. B65B 11/045
108/55.1

(Continued)

FOREIGN PATENT DOCUMENTS

EP 303264 A2 2/1980
WO 2006/011814 A1 2/2006

*Primary Examiner* — Jose V Chen
(74) *Attorney, Agent, or Firm* — Rankin, Hill & Clark LLP

(57) ABSTRACT

Methods for protecting a ground surface from exposure to material that may be spilled from or leak from one or more containers, which includes setting up a portable spill containment system that includes at least one grate for supporting the one or more containers. The grate includes a plurality of drain holes. The portable spill containment system includes a flexible bag configured to contain spills or leakage from the one or more containers that pass through the drain holes of the grate. In one embodiment, the portable spill containment system includes a plurality of pedestals that support the at least one grate. In another embodiment, the portable spill containment system includes an interconnected grid structure formed of separate and distinct spaced apart beams.

10 Claims, 15 Drawing Sheets

Related U.S. Application Data

(60) Provisional application No. 61/601,246, filed on Feb. 21, 2012.

(51) Int. Cl.
   *B65D 90/24* (2006.01)
   *F16N 31/00* (2006.01)

(52) U.S. Cl.
   CPC ........... *B65D 2519/0086* (2013.01); *B65D 2519/00308* (2013.01); *B65D 2519/00358* (2013.01); *B65D 2519/00442* (2013.01); *B65D 2519/00985* (2013.01)

(58) Field of Classification Search
   USPC ........... 108/55.1, 55.3, 55.5; 220/571.1, 571, 220/9.4, 9.1
   See application file for complete search history.

(56) References Cited

U.S. PATENT DOCUMENTS

| | | | |
|---|---|---|---|
| 4,263,855 A * | 4/1981 | Lawlor | B65D 19/004 108/53.3 |
| 4,838,178 A * | 6/1989 | Chriske | B65D 19/0026 108/55.1 |
| 5,020,667 A * | 6/1991 | Bush | B65D 19/0018 108/55.1 |
| 5,036,976 A * | 8/1991 | Sechler | B65D 19/004 108/53.1 |
| 5,042,396 A * | 8/1991 | Shuert | B65D 19/0012 108/57.25 |
| 5,052,569 A | 10/1991 | Cooper | |
| 5,249,699 A * | 10/1993 | Williams | B65D 19/0063 108/55.1 |
| 5,254,798 A | 10/1993 | Zoback | |
| 5,359,955 A | 11/1994 | Grebenyuk | |
| 5,429,236 A * | 7/1995 | Evans | B65D 19/0016 108/55.1 |
| D370,765 S * | 6/1996 | Heintz | D34/38 |
| 5,562,047 A * | 10/1996 | Forney | B65D 19/0002 108/24 |
| 5,579,700 A * | 12/1996 | Nuechterlein | B65D 19/0002 108/54.1 |
| 5,588,373 A * | 12/1996 | Bacskay | B65D 19/38 108/55.3 |
| 5,857,416 A * | 1/1999 | Donnell, Jr. | B65D 19/004 108/55.3 |
| 6,349,656 B1 * | 2/2002 | Mitchell | B65D 19/0087 108/53.1 |
| 6,382,108 B1 | 5/2002 | Stanek et al. | |
| 6,602,032 B2 * | 8/2003 | Arai | B65D 19/385 108/55.1 |
| 6,622,879 B1 * | 9/2003 | Carter | B65D 90/24 220/23.4 |
| 7,036,676 B2 | 5/2006 | Christensen | |
| 7,234,608 B2 | 6/2007 | Reed et al. | |
| 7,621,422 B2 | 11/2009 | Reed et al. | |
| 7,958,995 B2 | 6/2011 | Dedmon et al. | |
| 8,863,671 B2 * | 10/2014 | Shaw | B65D 19/40 108/25 |
| 9,150,350 B2 * | 10/2015 | Stanek | B65D 90/24 |
| 2004/0261329 A1 | 12/2004 | Kugler et al. | |

* cited by examiner

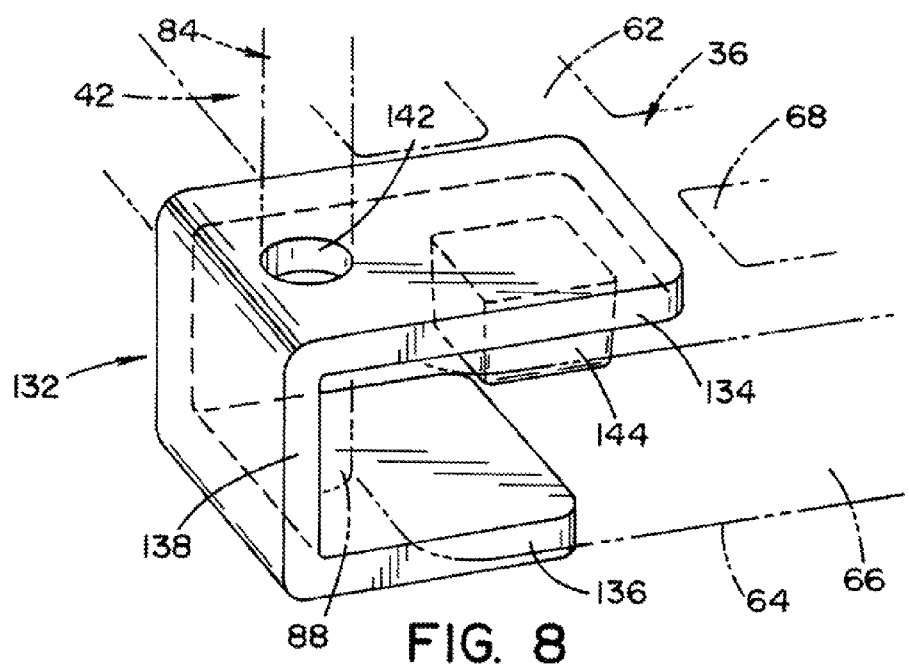
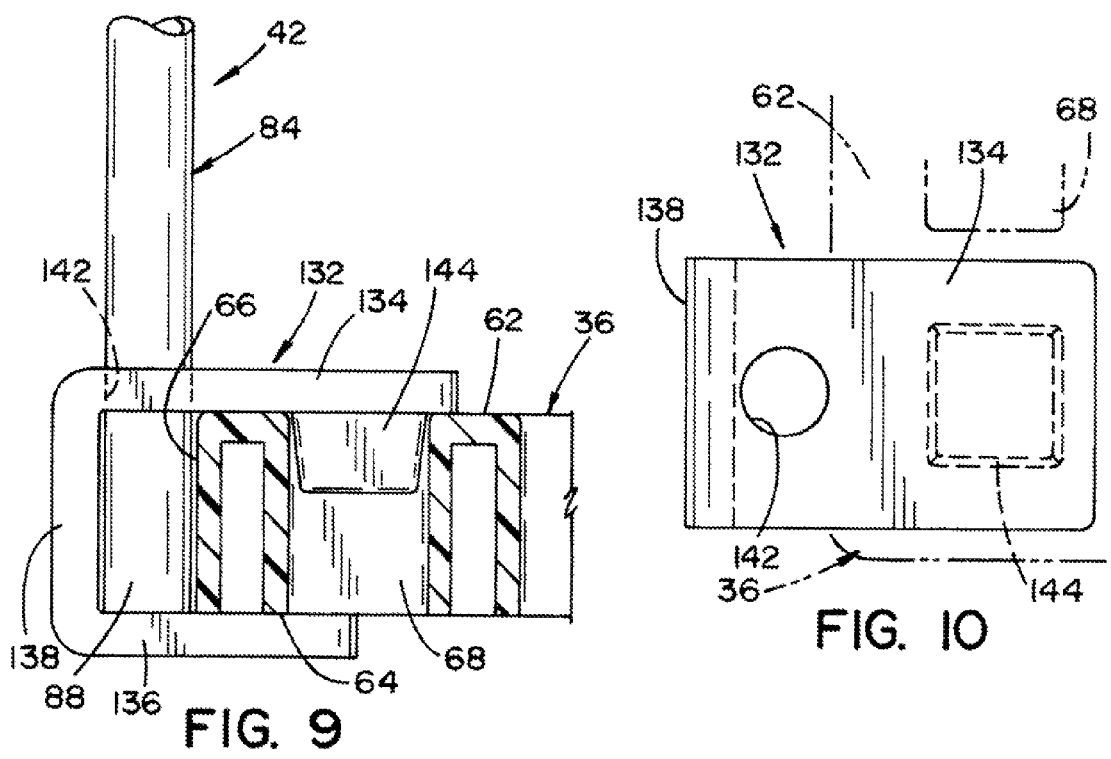

METHODS FOR PROTECTING A GROUND SURFACE FROM EXPOSURE TO MATERIAL THAT MAY BE SPILLED FROM OR LEAK FROM ONE OR MORE CONTAINERS

CROSS-REFERENCE TO RELATED APPLICATIONS

This application is a continuation of U.S. patent application Ser. No. 14/380,357, filed Aug. 21, 2014, now U.S. Pat. No. 9,150,350 B2, which is a U.S. National Stage of PCT/US2013/027026, filed Feb. 21, 2013, and claims priority to U.S. Provisional App. Ser. No. 61/601,246, filed Feb. 21, 2012.

BACKGROUND OF THE INVENTION

Field of Invention

The present invention relates to portable spill containment systems.

Description of Related Art

Drums or containers are commonly used to store solids or fluids. These drums or containers can sometimes leak or spill their contents during storage or use. It is desirable to contain such spilled or leaked contents to reduce the risk of damage or injury that such contents could cause.

Spill containment assemblies such as disclosed in U.S. Pat. Nos. 7,234,608 and 7,621,422, both of which are owned by the assignee of the present application, can be used to support drums or containers on grates above a flexible containment bag. Such filled containment assemblies more than adequately meet the requirements for basic spill containment. However, additional improvements and features are disclosed herein.

BRIEF SUMMARY OF THE INVENTION

According to one aspect, a portable spill containment system according to the invention includes at least one grate that supports a container. The grate defines a plurality of drain holes. The spill containment system also includes a flexible bag that contains leakage from the container that passes through the drain holes of the grate. The portable spill containment system also includes a plurality of pedestals that support the at least one grate. The pedestals each include a top wall with a primarily planer face that faces the grate. The pedestals each include a plurality of primary projections that extend from the planer face of the top wall toward the grate.

According to another aspect, a portable spill containment system includes at least one grate that supports a container. The grate defines a plurality of drain holes. The portable spill containment system also includes a flexible bag that defines an interior to contain leakage from the container that passes through the drain holes of the grate. The flexible bag includes a bag bottom and a bag sidewall. The bag bottom and the bag sidewall each include an interior surface that faces the grate and an exterior surface that is opposite the respective interior surface. The portable spill containment system also includes a plurality of first beams that are spaced from and oriented parallel to one another. The first beams each include a first beam top surfaces that faces the grate and a first beam bottom surface that is opposite the first beam top surface. The portable spill containment system also includes a plurality of second beams being spaced from one another and crossing the plurality of first beams. The second beams each include a second beam top surface that faces the grate and a second beam bottom surface that is opposite the second beam top surface. The first beams and the second beams are disposed within the flexible bag so that at least one of the first beam top surfaces and the second beam top surfaces contacts the grate and at least of the first beam surfaces and the second beam bottom surfaces contacts the interior surface of the bag bottom of the flexible bag.

According to another aspect, a portable spill containment system includes at least one grate that supports a container. The grate defines a plurality of drain holes. The portable spill containment system also includes a plurality of pedestals that support the at least one grate. The pedestals each include a top wall with a primarily planer face that faces the grate. The pedestals each include a plurality of primary projections that extend from the planer face of the top wall toward the grate. The portable spill containment system also includes a flexible bag that receives the plurality of pedestals and contains leakage from the container that passes through the drain holes of the grate. The flexible bag includes an interior surface that faces the plurality of pedestals and an exterior surface that is opposite the interior surface. The portable spill containment system also includes a carry handle that is attached to the exterior surface of the flexible bag at a plurality of locations so as to define a loop.

According to another aspect, a portable spill containment system includes at least one grate that supports a container. The grate defines a plurality of drain holes. The portable spill containment system also includes a flexible bag that contains leakage from the container that passes through the drain holes of the grate. The portable spill containment system also includes a plurality of pedestals that support the at least one grate. The pedestals each include a top wall with a primarily planar face that faces the grate. The planar face includes at least one indentation. The grate includes at least one projection that downwardly extends toward the plurality of pedestals so as to be received by the at least one indentation.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

BRIEF DESCRIPTION OF THE DRAWINGS

FIG. 8 is a partial perspective view of a post bracket.

FIG. 9 is a sectional view of FIG. 8.

FIG. 10 is a plan view of FIG. 8.

It should be understood that the descriptions and drawings herein are merely illustrative and that various modifications and changes can be made in the structures disclosed without departing from the present disclosure. In general, the figures are not to scale. It will be appreciated that the various identified components of the exemplary portable spill containment system disclosed herein are merely terms of art that may vary from one manufacturer to another and should not be deemed to limit the present disclosure.

DETAILED DESCRIPTION OF THE INVENTION

Figure 1:
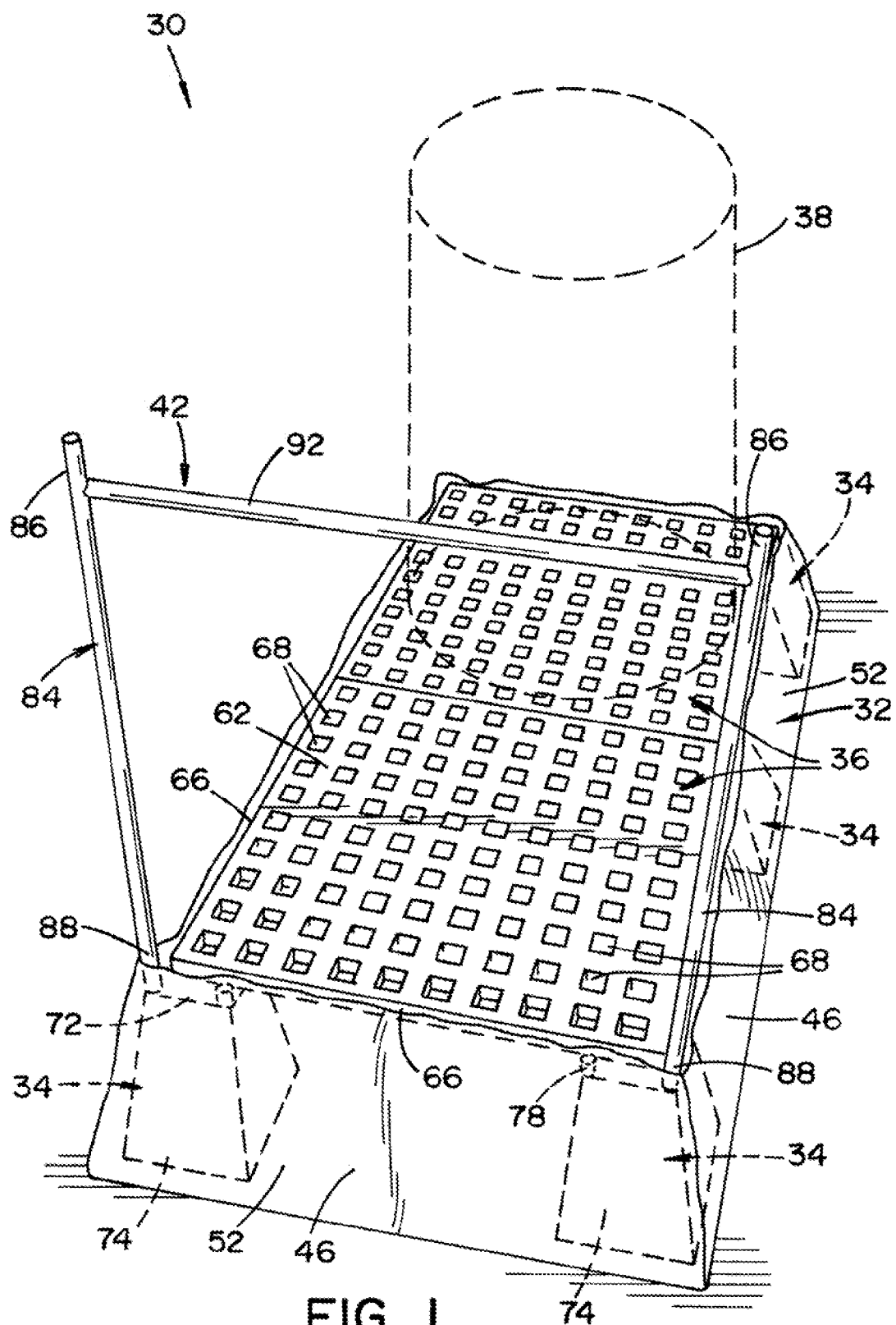
FIG. 1 is a perspective view of a portable spill containment system.

Referring now to the drawings, wherein like numerals refer to like parts throughout the several views, FIG. 1 illustrates a portable containment system 30. The portable containment system 30 includes a flexible bag 32, a plurality of pedestals 34, and at least one grate 36. As illustrated, the grate 36 supports a container 38. Further, a railing 42 can be attached to the pedestals 34.

With reference to FIGS. 1-3 and 7, the flexible bag 32 is formed of a flexible fabric or sheet that defines an integral fluid-tight or leak-proof structure. Initially, it is noted that the term 'leakage' could include solids or liquids. The flexible bag 32 includes a bag interior 44 that is defined by the bag sidewall 46. The bag sidewall 46 includes a bag sidewall interior surface 48 and a bag sidewall exterior surface 52, which is opposite the interior surface 48. The flexible bag 32 contains any leakage that may occur from the container 38 that has passed through the grate 36.

As illustrated, the flexible bag 32 also includes a bag bottom 54 that is opposite the grate 36. For reference, the bag sidewall 46 defines an opening that receives the grate 36. The bag bottom 54 includes a bag bottom interior surface 56 and bag bottom exterior surface 58, with the bag bottom exterior surface 58 being opposite the bag bottom interior surface 56. As illustrated, the bag 32 receives the plurality of pedestals 34 and contains leakage from the container 38. The interior surfaces 48, 56 of the flexible bag 32 face the plurality of pedestals 34.

Figure 2:
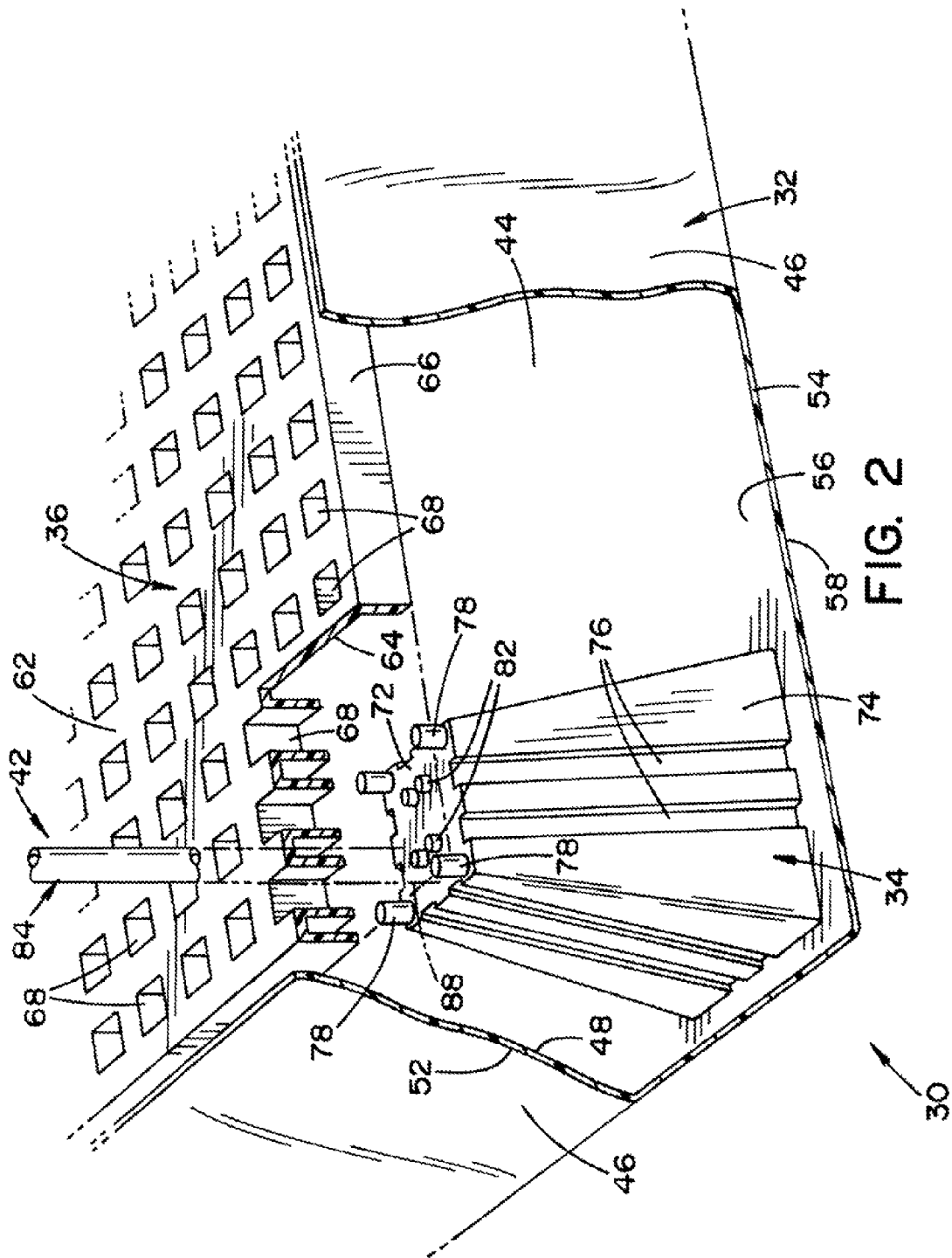
FIG. 2 is a partial perspective view of FIG. 1 with a portion of a grate removed.
Figure 3:
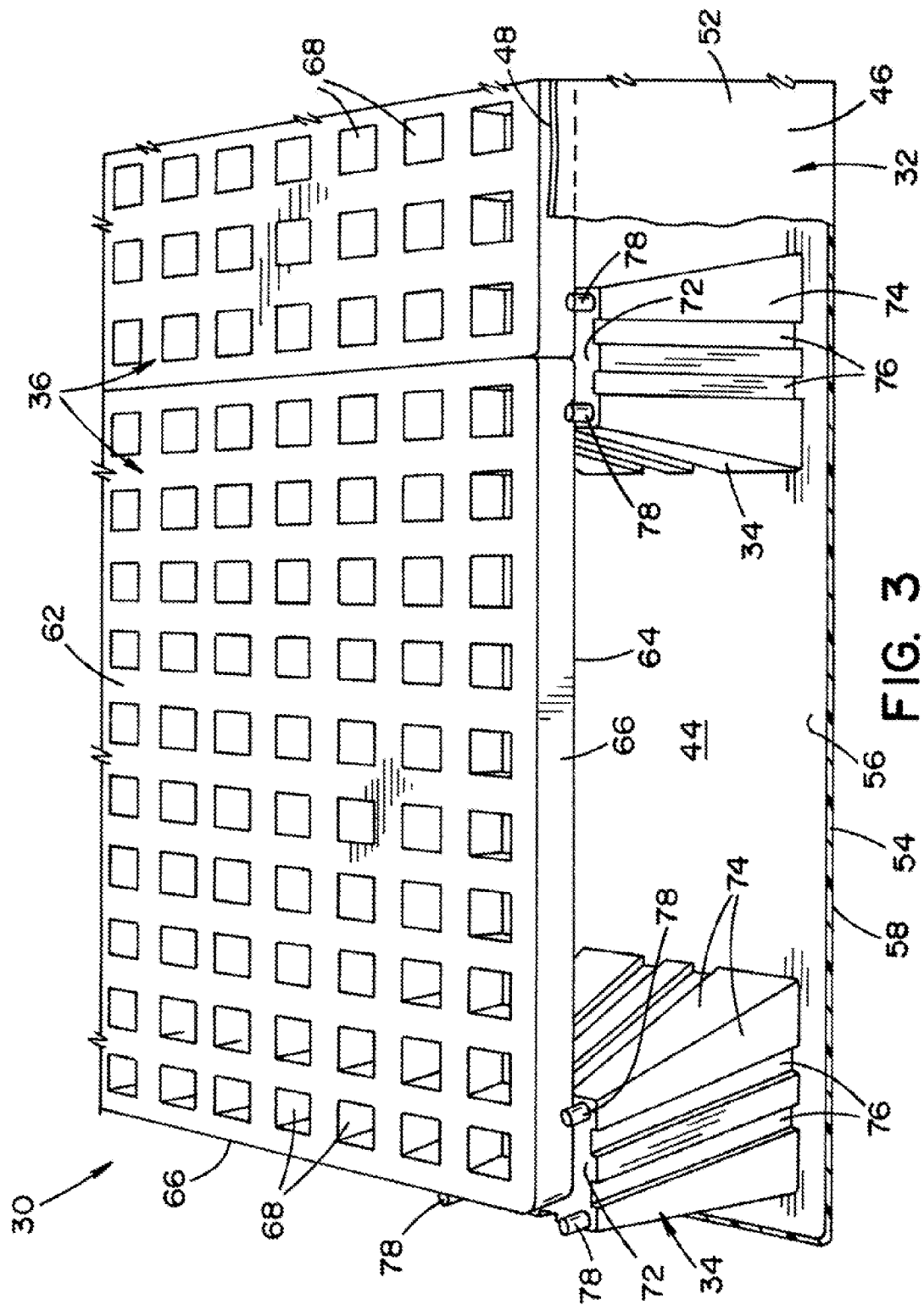
FIG. 3 is a partial perspective view of FIG. 1 with a portion of a flexible bag removed.

With the continued reference to FIGS. 1-3, the grate 36, which could also be referred to as a support deck, includes an upper grate surface 62 and a lower grate surface 64 and is of a generally rectangular shape. The grate 36 can be made from injection-molded or rotationally molded plastic or structured foam. The lower grate surface 64 is opposite the upper grate surface 62. The grate 36 also includes a side grate surface 66 that faces the bag sidewall 46. The grate 36 also defines a plurality of drain holes 68 that allow leakage from the container 38 to pass therethrough for collection in the bag 32. Further, the grate 36 serves to support the container 38. While illustrated as being a plurality of grates, it will be appreciated that the grate 36 could be a single grate or a plurality of grates.

Figure 7:
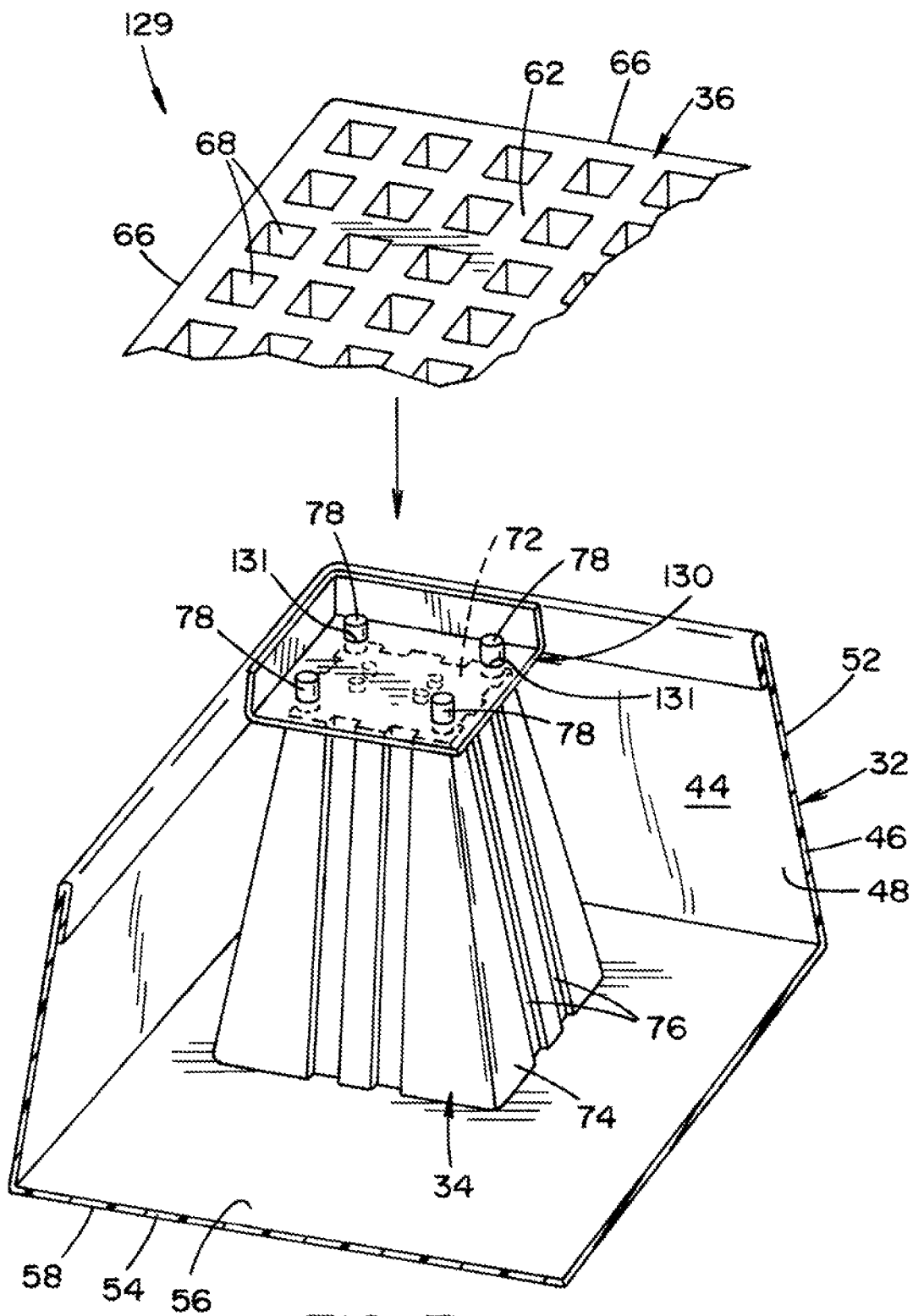
FIG. 7 is an exploded partial perspective view of an alternative portable spill containment system.

With particular attention to FIGS. 2-3 and 7, the pedestal 34 is shown. The pedestal 34 includes a pedestal top wall 72 that has a generally planar face that faces toward the grate 36. The planar face allows for a stable interface between the pedestals 34 and the grate 36. The pedestals 34 are hollow, which allows them to be stacked on atop the other in nested fashion, much like disposable drinking cups (open end down). This allows for the pedestals 34 to be shipped and stored in a compact condition. The pedestal wall 74 can define a plurality of grooves 76 that extend in a generally vertical direction. The grooves 76 increase the strength of the pedestals 34 and also allow air to enter between the pedestals 34 when they are being separated from each other (i.e., un-nested), making separation easier As shown in FIGS. 2-3, the pedestals 34 are single-piece, unitary construction, which can be made from injection-molded or rotationally molded plastic or structured foam. The pedestals 34 may reduce in cross-sectional size as they extend from the bag bottom 54 toward the grate 36 so as to have a tapered shape. This tapered shape allows a wide base to increase stability with a smaller top to reduce the number of drain holes 68 that are obstructed by the pedestal 34. It will be appreciated that additional pedestals could be used to support the grate 36 at positions other than the perimeter (i.e., under the center of the grate). The pedestals 34 illustrated in FIGS. 1-3 and 7 are single-piece, unitary pedestals.

The pedestals 34 include a plurality of primary projections 78 that extend from the planer face of the top wall 72 toward the grate 36 so as to be received alongside the grate 36. As illustrated, the primary projections 78 have a circular cross-section. However, it will be appreciated that other shapes are contemplated. The pedestals 34 can also include a plurality of secondary projections 82 that extend from the planer face of the top wall 72 toward the grate 36. Although the secondary projections 82 are shown as having a circular cross-section, it will be appreciated that other shapes are possible. Specifically, any shape that allows the secondary projections 82 to be received in the drain hole 68 of the grate 36 is possible. As illustrated, the primary projections 78 are disposed around a perimeter of the top wall 72 so as to at least partially surround the secondary projections 82. This arrangement helps to keep the grate 36 secured to the pedestal 34.

Further, the secondary projections 82 define a secondary projection length as they extend from the top wall 72 toward the grate 36 just as the primary projections 78 define a primary projection length as they extend from the top wall 72 toward the grate 36. As illustrated, the primary projection length is greater than the secondary projection length. This difference in projection length between the primary projections 78 and the secondary projections 82 allows for the grate 36 to be indexed to the pedestal 34 with the primary projections 78 while still providing positive engagement between the grate 34 and the secondary projections 82.

It will be appreciated that the primary and secondary projections 78, 82 described hereinabove could be part of the grate 36 instead of the pedestals 34. Specifically, alternate projections could downwardly extend from the grate 36 toward the pedestals 34 so as to provide similar engagement between the grate 36 and the pedestals 36 as previously described. It will also be appreciated that if alternate projections extending from the grate were utilized, that the pedestals could include at least one bore or indentation provided in the top wall to receive the respective projections. Further, it will be understood that a combination of projections extending from the grate and projections extending from the pedestal could simultaneously be employed without departing from the scope of the invention.

With reference to FIGS. 1-2, a plurality of posts 84 are shown. The posts 84 each include a first end 86 and a second end 88, with the second end 88 being opposite the first end 86. The plurality of posts 84 are joined to one another by a connecting rail 92 that attaches near the first end 86 of each of the posts 84. Further, the posts 84 can be attached to the pedestals 34 at the second end 88 of the respective posts 84. As such, the second end 88 of the respective post 84 can receive at least a portion of the primary projection 78 of the pedestal 34. Therefore, the posts 84 can be mounted to the pedestal 34 without the use of additional hardware, thereby minimizing cost and simplifying assembly of the system.

Figure 4:
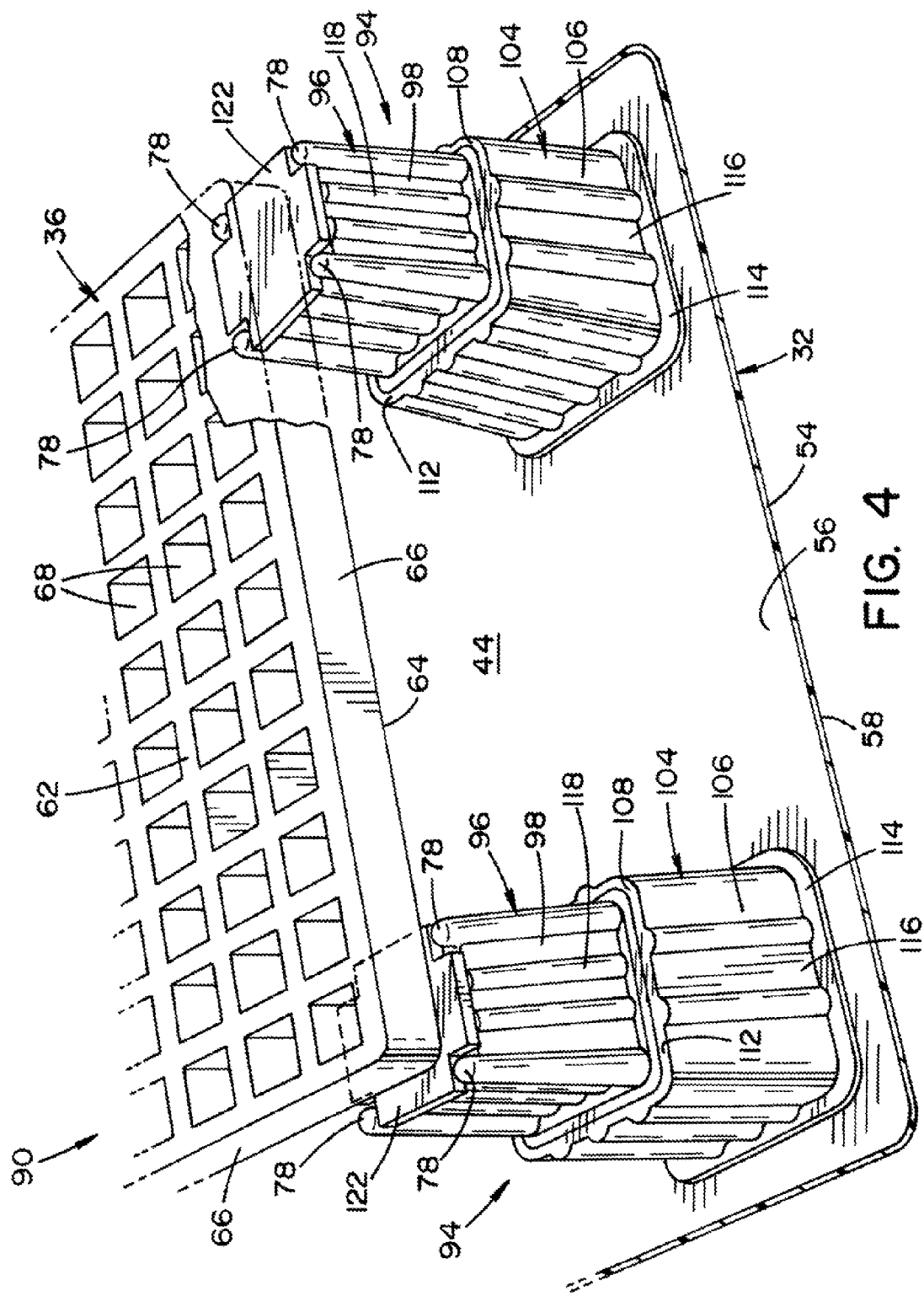
FIG. 4 is a partial perspective view of an alternative portable spill containment system.
Figure 5:
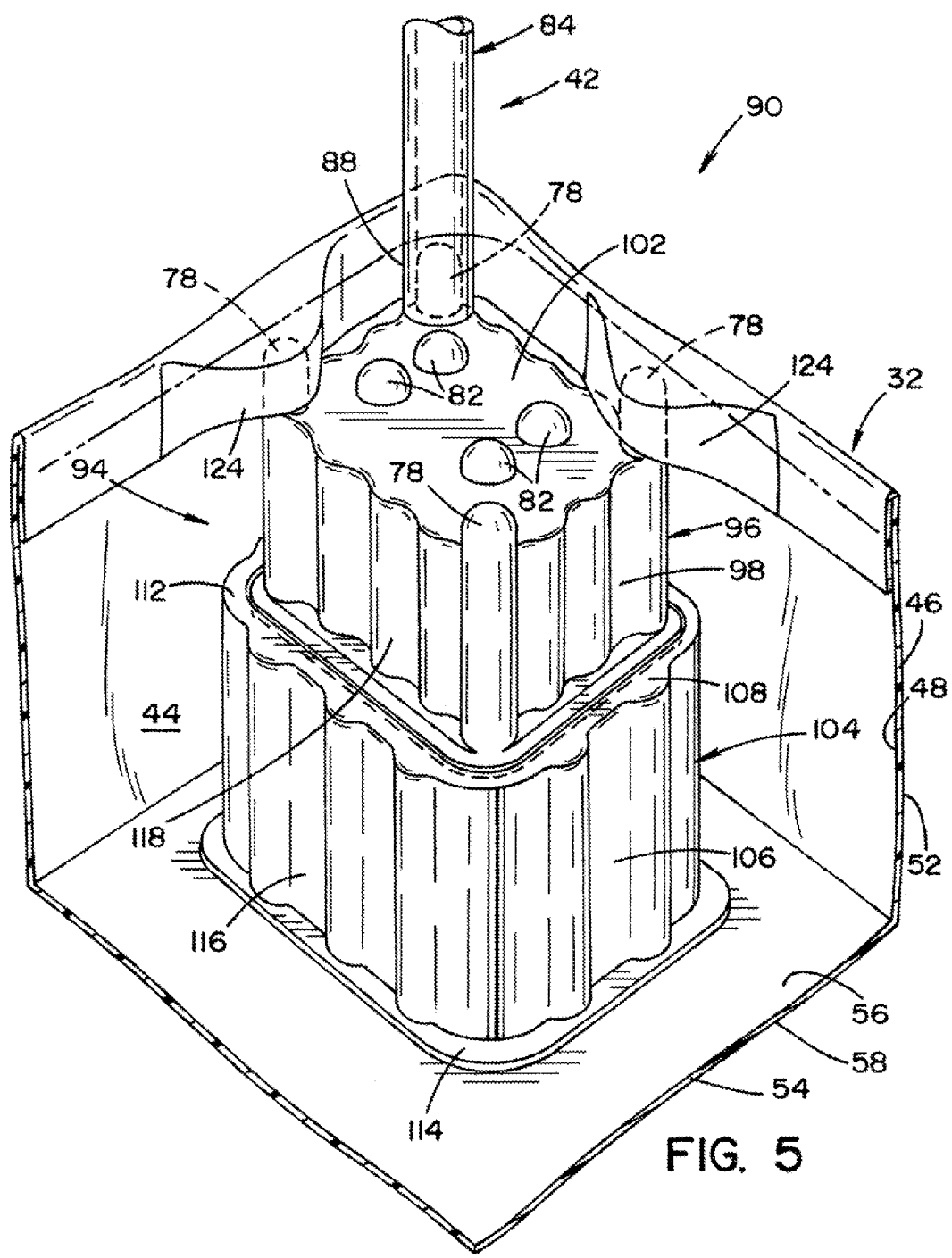
FIG. 5 is a partial perspective view of composite pedestals shown in FIG. 4.

With reference to FIGS. 4-5, an alternative containment system 90 with a a composite pedestal 94 is shown. The composite pedestal 94 can be made of the same materials as the pedestal 34. Further, the composite pedestal 94 can also be hollow. The composite pedestal 94 can include an upper pedestal member 96 with a sidewall 98 and a top wall 102. The composite pedestal 94 can also include a lower pedestal member 104 with a sidewall 106 and a top wall 108.

The lower pedestal member 104 can include a raised rim 112. This raised rim 112 can be used to prevent lateral disengagement between the upper pedestal member 96 and the lower pedestal member 104. The lower pedestal member 104 can also include a base ring 114. This base ring increases a general footprint of the pedestal 94 to increase stability while being received with the bag 32.

As illustrated, the lower pedestal member 104 can also include a bead 116 and the upper pedestal member 96 can include a column 118. The bead 116 and the column 118 cooperate to assist when the respective pedestal members 96, 104 are respectively nested, similar in function to the groove 76. As shown, a block 122 may be used as an interface between the grate 36 and the composite pedestal 94. The block 122 may optionally be used to adjust an overall height of the grate 36. As shown in FIG. 5, the composite pedestal 94 includes primary projections 78 and secondary projections 82 as like the pedestal 34.

The composite pedestal 94 allows for customization. Specifically, depending upon the particular needs, the end user could use only upper pedestal member 96 or the lower pedestal member 104 to support the grate 36. Alternatively, the end user could use both the upper pedestal member 96 and the lower pedestal member 104 to form taller pedestal structures. Thus, for small volume containment needs or in instances when the grate 36 is going to be used to store a drum or container in a workstation configuration, a shorter single pedestal member could be used. However, in instances when a pallet of drums was going to be stored and the volume of potentially leakable materials is greater, taller multi-component pedestals could be used.

As illustrated in FIG. 5, the bag 32 can include a pocket 124 that receives the primary projection 78 so as to attach the bag 32 to the pedestal 34, 94. Specifically, at least one of the primary projections 78 can at least be partially inserted through the pocket 124. The pocket 124 may be made of the same or similar materials as the bag 32. Alternatively, the pocket 124 may be made of other materials that provide sufficient strength to connect the bag 32 to the pedestal 34. Further, the pocket 124 may be integral to the bag 32 or a separate component.

Figure 6:
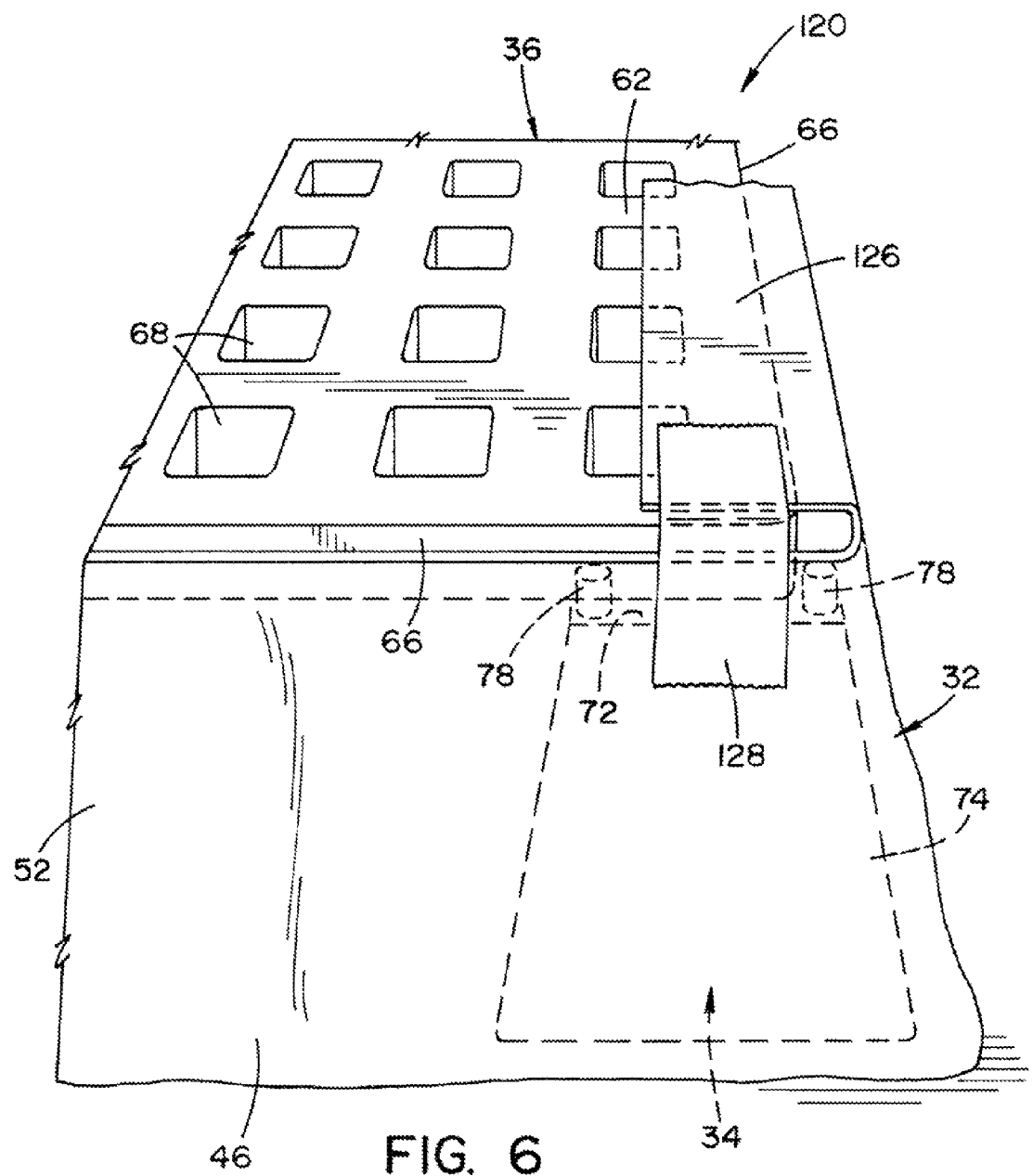
FIG. 6 is a partial perspective view of an alternative portable spill containment system.

With reference to FIG. 6, an alternate containment system 120 is shown. The bag 32 can include a sidewall flap 126. The sidewall flap 126 at least partially extends onto the upper grate surface 62 of the grate 36. The sidewall flap 126 may be of the same material and construction as the bag sidewall 46. The sidewall flap 126 may be affixed to the grate 36 with adhesive tape 128. This tape 128 may be used solely to attach the bag 32 to the pedestal 34, 94 or in addition to other attachment methods.

With reference to FIG. 7, an alternate containment system 129 is shown. The alternate containment system 129 utilizes the bag 32 and pedestal 34 to contain any leakage that has passed through the drain holes 68 of the grate 36. However, the alternate containment system 129 also includes a mounting member 130. The mounting member 130 is disposed between the pedestal 34 and the grate 36 to ensure that the bag sidewall 46 of the bag 32 remains sufficiently vertical so as provide an adequate volume for capturing the leakage. As illustrated, the mounting member 130 includes mounting holes 131 that receive the primary projections 78. The mounting member 130 may be integral to the bag 32 or may be a separate component that is connected to the bag 32. As such, the mounting member 130 may be made of any material that provides sufficient strength to retain the bag sidewall 46 in a generally upright position. Because the mounting member 130 is disposed between the pedestal 34 and the grate 36, the mounting member 130 is exposed to downward force due to the weight of the container 38 (i.e., a compressive force between the pedestal 34 and the grate 36). As such, the connection strength between the bag 32 and the pedestal 34 improves as the weight of the container 38 on the grate 36 is increased.

With reference to FIGS. 8-12, post brackets are shown. The post brackets can be used to mount the post 84 to the grate 36. The post brackets can be used in addition to or in place of mounting the post 84 to the primary projections 78. Further, the post brackets can be made of any number of materials that provide sufficient strength and rigidity to support the post 84 as will be described in more detail hereinafter.

With reference to FIGS. 8-10, a clamp 132 is used as a post bracket. The clamp 132 includes an upper wall 134, a lower wall 136, and a connecting wall 138. The upper wall 134 defines a posthole 142. The grate 36 is disposed between the upper wall 134 and the lower wall 136. Because of the shape of the clamp 132, the clamp 132 can be securely connected to the grate 36, while still permitting removal of the clamp 132 from the grate 36 when desired.

In particular, the posthole 142 receives the post 84 to allow for easy attachment of the post 84 to the grate 36. Specifically, the first end 86 of the post 84 is vertically spaced from the grate 36 a distance that is greater than a vertical distance between the second end 88 of the post 84 and the grate 36. The bracket can further include a retention member 144 that extends from the upper wall 134 toward the lower wall 136 so as to be received at least one of the drain holes 68. The retention member 144 can have a square cross-sectional shape. This shape complements the shape of the drain hole 68 for sufficient engagement. The connecting wall 138 joins the upper wall 134 and the lower wall 136 so that the post 84 is disposed between the connecting wall 138 and the grate 36, thereby ensuring a sturdy connection.

Figure 11:
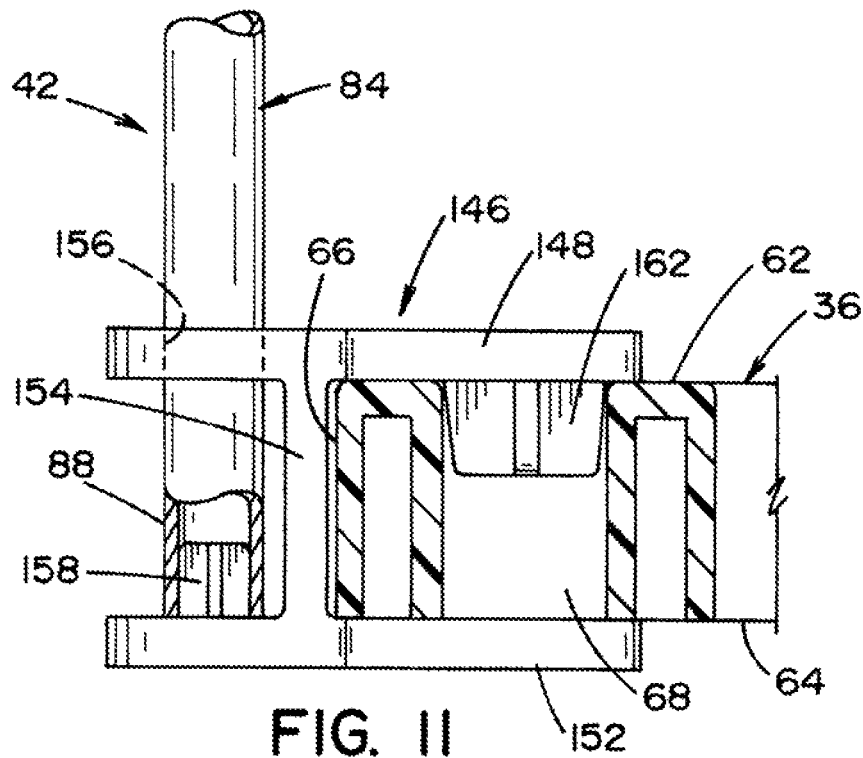
FIG. 11 is a partial sectional view of an alternative post bracket.
Figure 12:
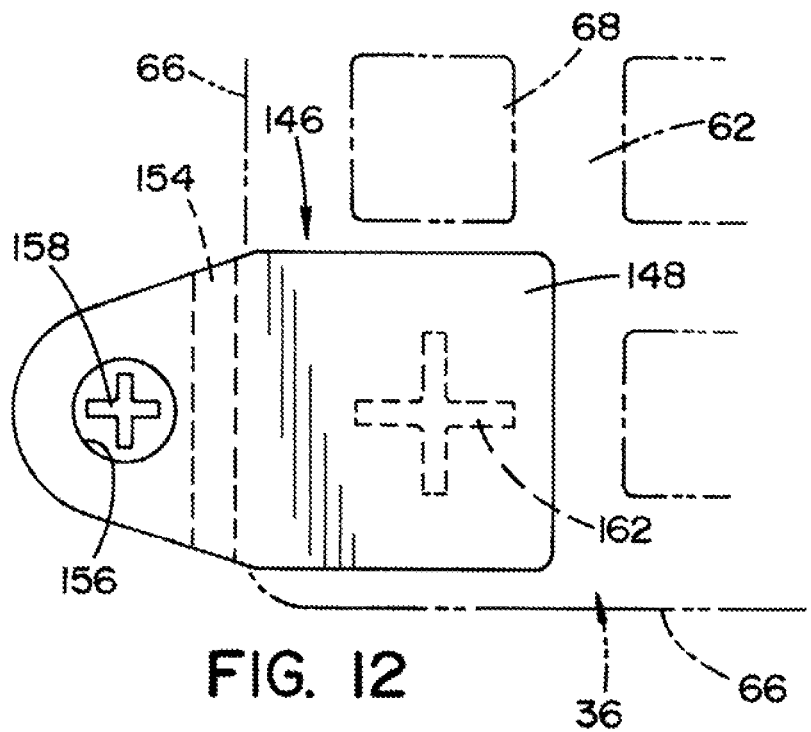
FIG. 12 is a plan view of FIG. 11.
Figure 13:
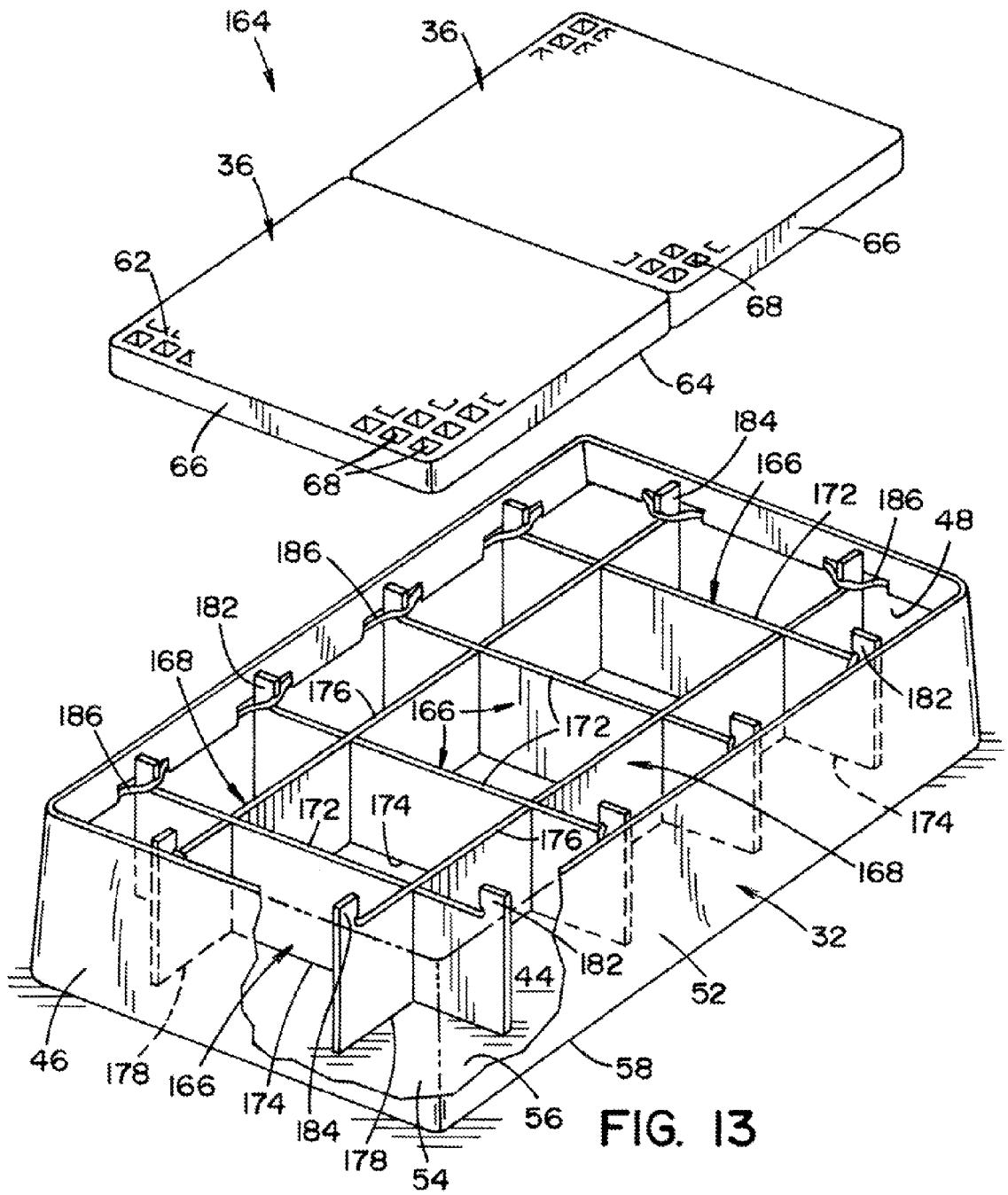
FIG. 13 is an exploded partial perspective view of an alternative portable containment system.

With reference to FIGS. 11-12, an alternate bracket is shown as a clip 146. The clip 146 can include an upper wall 148 and a lower wall 152. A partition wall 154 joins the upper wall 148 and the lower wall 152 together so that the partition wall 154 is disposed between the post 84 and the grate 36. The upper wall 148 can also include a post aperture 156 for receipt of the post 84. Further still, a post boss 158 can extend from the lower wall 152 toward the upper wall 148 so as to be in registry with the post aperture 156 for engagement with the second end of the post 84. The post boss 158 provides additional stability to the connection between the post 84 and the clip 146. The clip 146 can also include a retention projection 162 with an X-shaped cross-section. The retention projection 162 extends from the upper wall 148 toward the lower wall 152 and is received in the drain holes 68 of the grate 36. The X-shaped cross-section of the retention projection 162 helps to minimize weight and material cost for the clip 146 while still providing sufficient engagement between the clip 146 and the grate 36.

With reference to FIGS. 13-16, an alternate containment system 164 is shown. The containment system 164 can include a first beam 166 and a second beam 168. The beams 166, 168 can have a generally rectangular shape and be made of any number of materials. It is envisioned that the beams 166, 168 be constructed of materials that are chemically inert and lightweight. However, other materials are possible and contemplated. The first beams 166 are spaced from and oriented parallel to one another. Further, the first beams 166 each include a first beam top surface 172 that faces the grate 36 and a first beam bottom surface 174 that is opposite the first beam top surface 172.

The second beams 168 are spaced from one another. As illustrated, the second beams 168 are oriented perpendicular to the plurality of first beams 166. However, it will be understood that the second beams 168 could be oriented to the plurality of first beams 168 in alternative layouts. The second beams 168 can each include a second beam top surface 176 that faces the grate 36 and a second beam bottom surface 178 that is opposite the second beam top surface 176. The first beams 166 and the second beams 168 are disposed within the flexible bag 32 so that at least one of the first beam top surfaces 172 and the second beam top surfaces 176 contacts the grate 36 and at least one of the first beam bottom surfaces 174 and the second beam bottom surfaces 178 contacts the interior surface of the bag bottom 54 of the bag 32. The first beams 166 and the second beams 168 can include beam fingers 182, 184, respectively. It will be appreciated that the first and second beams 166, 168 could be spaced from one another greater than is illustrated so as to create a large void in a center of the assembly so as to create a picture frame type support. As the number of beams 166, 168 is reduced, the storage capacity of the bag 32 is increased.

Figure 14:
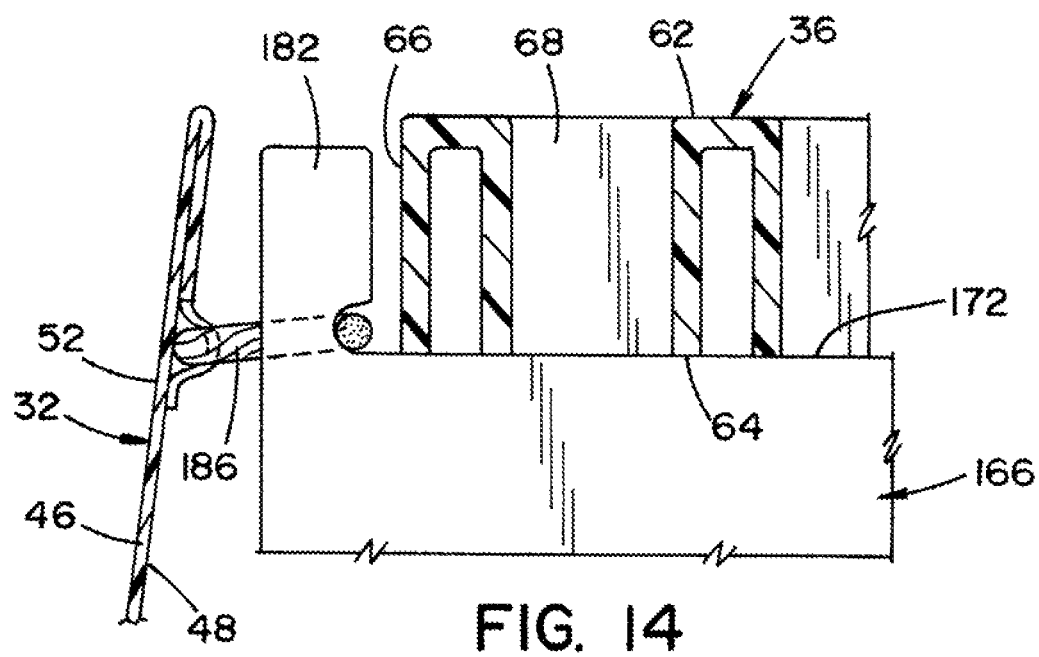
FIG. 14 is a partial sectional view of FIG. 13.

As shown in FIG. 14, the flexible bag 34 may include a plurality of yokes 186 that extend toward the interior of the flexible bag 32. The yokes 186 may be made of the same or similar material as the bag 32. Alternatively, the yokes 186 may be made of any other material while provides sufficient strength to hold the bag 32 to the beams 166, 168 when the bag 32 is full of leaked material. The fingers 182, 184 can removably engage the yokes 186 of the bag 32 to attach the bag 32 to the beams 166, 168.

Figure 15:
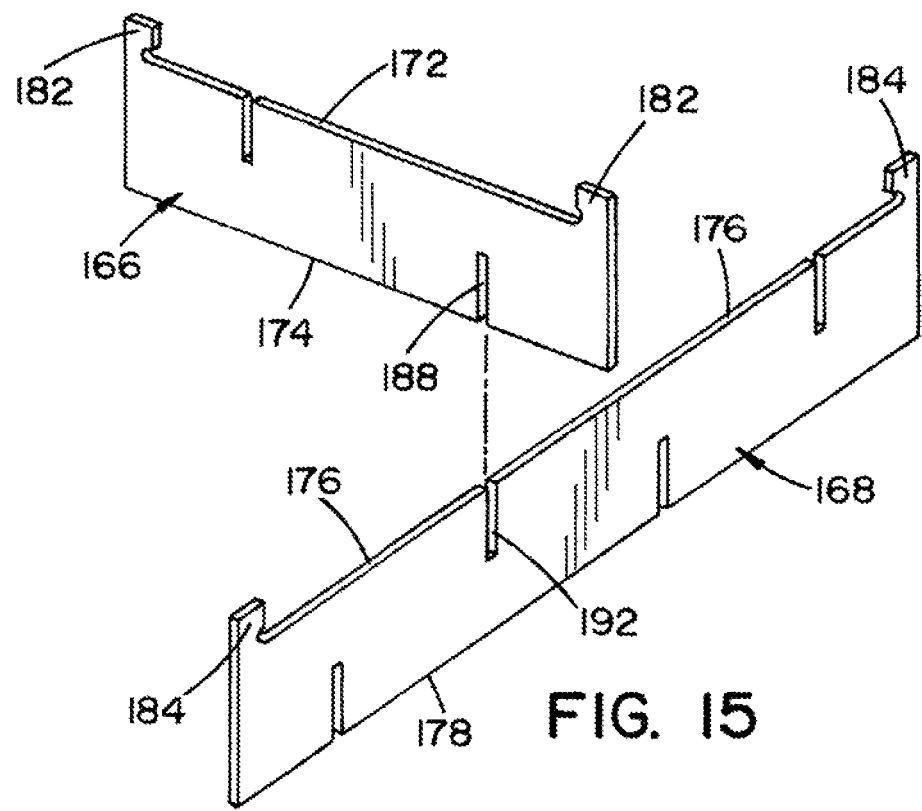
FIG. 15 is an exploded partial perspective view of FIG. 13.

With reference to FIG. 15, the first beam 166 and the second beam 168 are shown in an exploded view. The first beam 166 can include a joining channel 188 and the second beam 168 can include a joining channel 192. The joining channels 188, 192 cooperate with one another to allow assembly of the first beams 166 and second beams 168 together in a structurally rigid configuration as illustrated.

Figure 16:
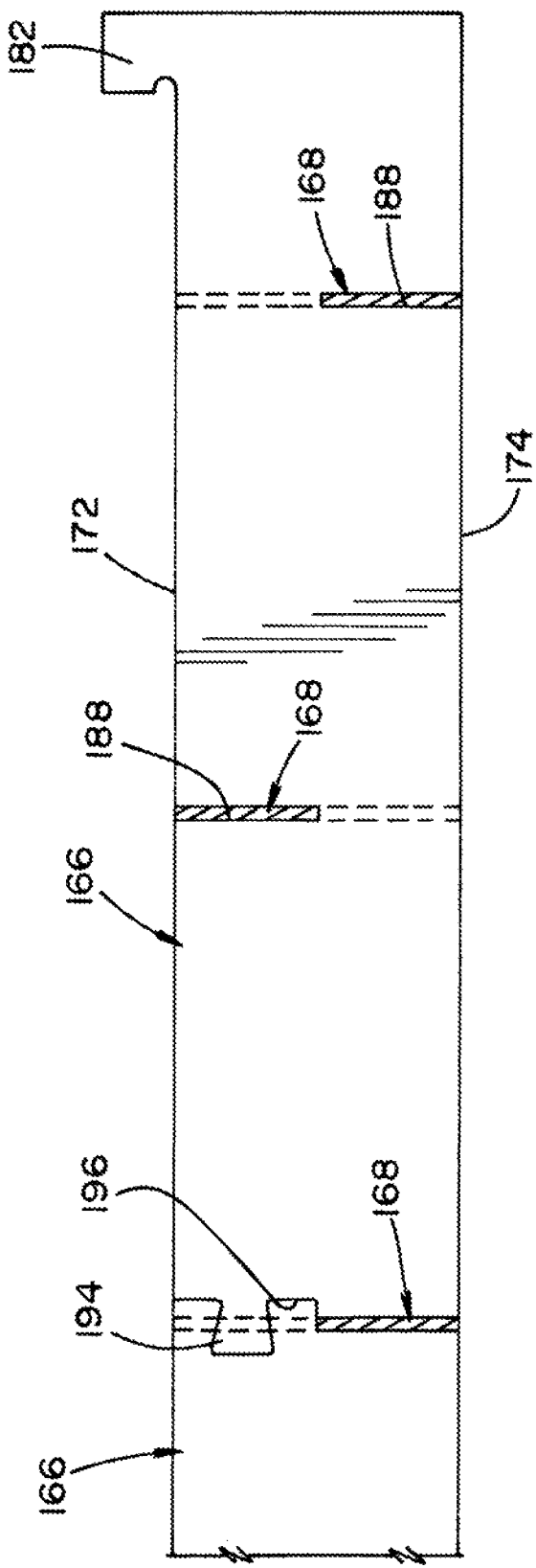
FIG. 16 is a partial sectional view of FIG. 13.

With reference to FIG. 16, the first beam 166 is shown. As illustrated, the first beam 166 can include a tab 194 and slot 196. The tab 194 and the slot 196 complement one another to allow shorter lengths of the first beam 166 to be combined to increase the overall length. It will be appreciated that a similar type of tab/slot layout could be used with the second beam 168.

Figure 17:
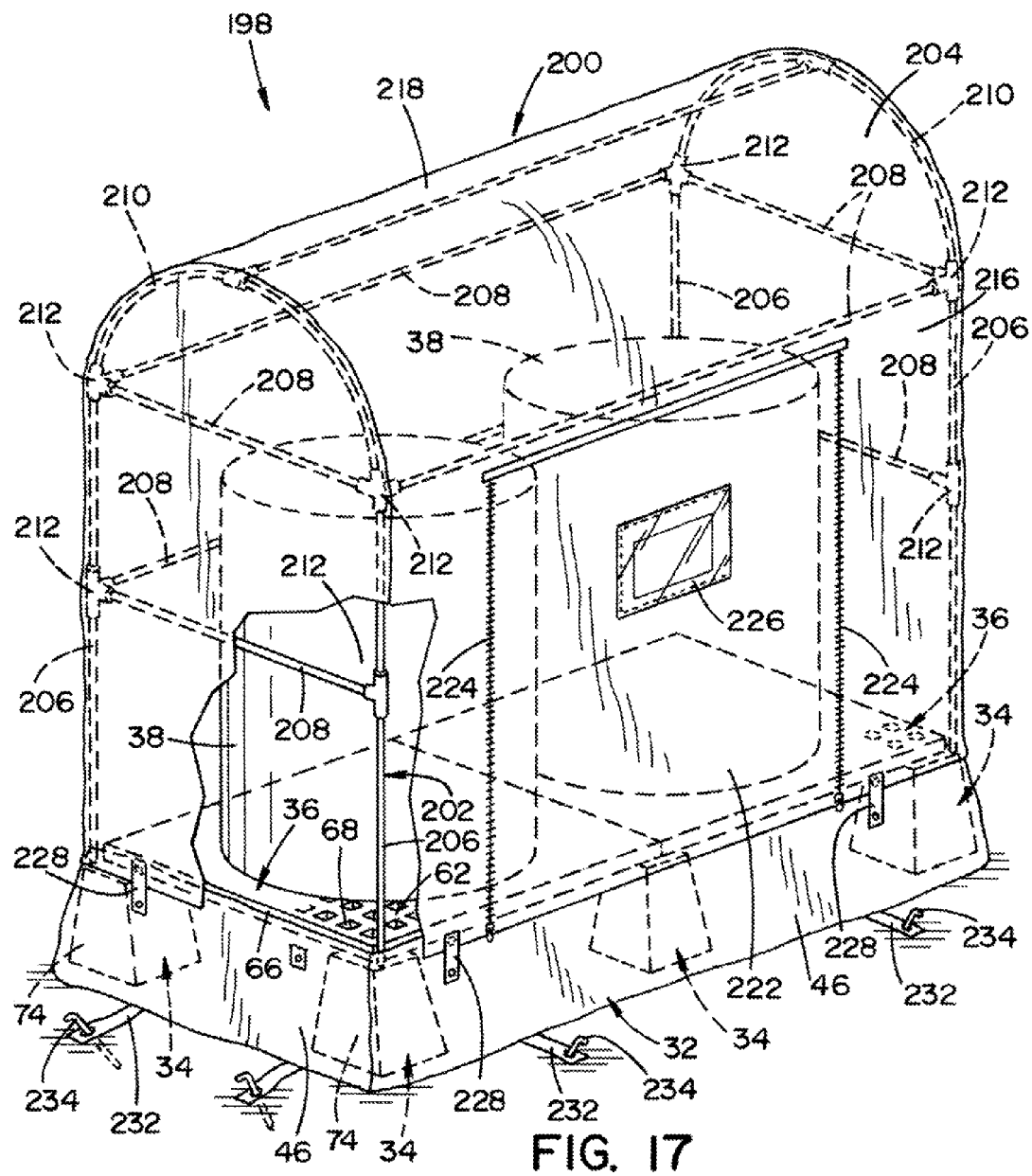
FIG. 17 is a perspective view of an alternative portable containment system.

With reference to FIG. 17, an alternative spill containment system 198 with an enclosure is shown. This system 198 includes a canopy 200. The canopy includes a frame 202 that supports a covering 204. The frame 202 includes a plurality of upright members 206, linear connection members 208, and curved connection members 210. These members 206, 208, 210 are held together with a variety of connectors 212. The frame 202 cooperates with the covering 204 to define a shell wall 216 and a shell top 218. Further, a shell door 222 is affixed to the shell wall 216 with a zipper 224 to allow access within the canopy 200. Further, a document window 226 can be used to retain various documents associated with the materials located within the container 38. Further still, a tie down 228 may be used to affix the shell wall 216 to the flexible bag 32. Finally, a mounting strap 232 can be used in conjunction with a stake 234 to affix the containment system 198 to the ground or otherwise.

Figure 18:
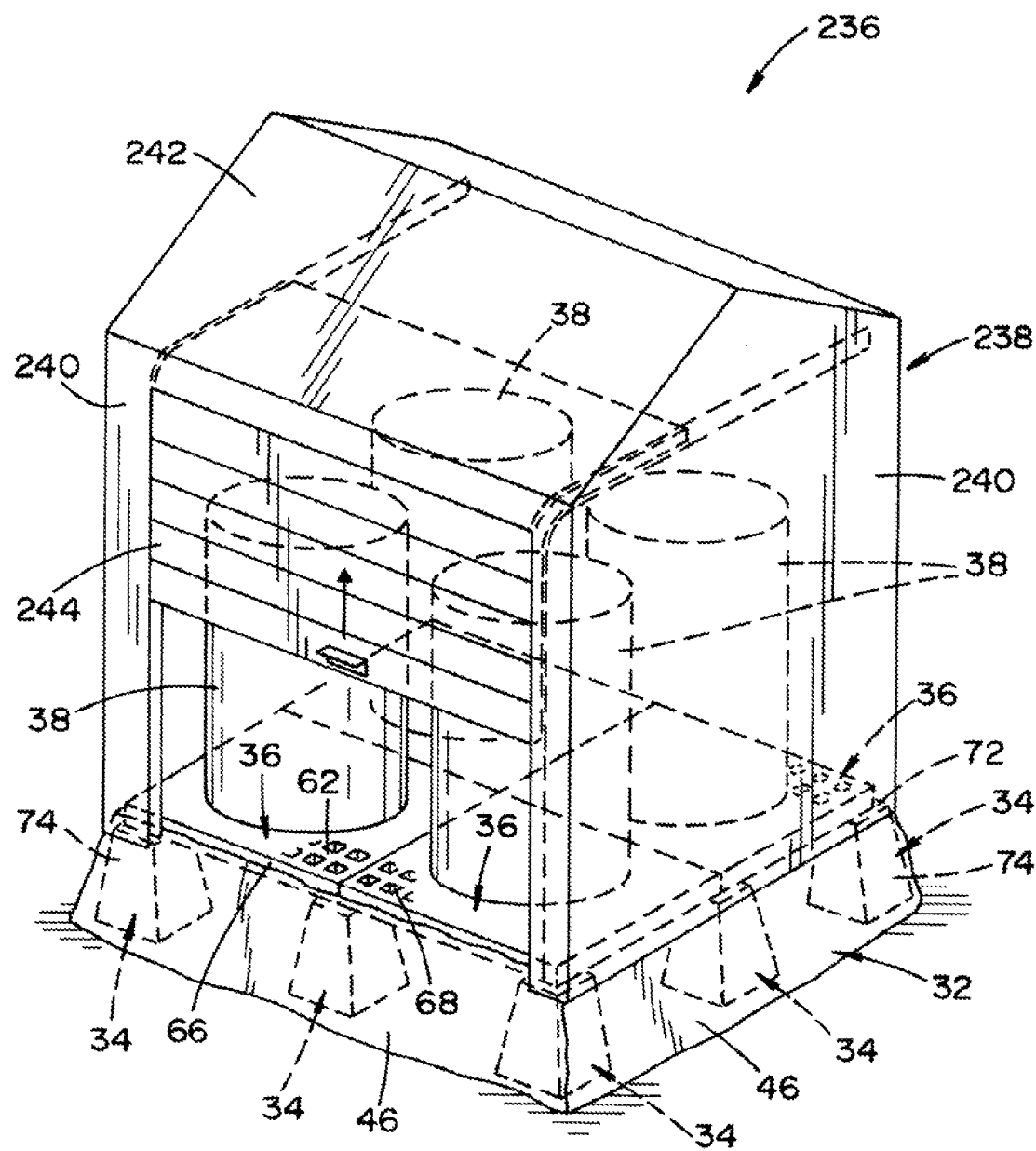
FIG. 18 is a perspective view of an alternative portable containment system.

With reference to FIG. 18, an alternate containment system 236 with an enclosure is shown. This system 236 includes a rigid structure 238 with panels 240 and a roof 242. Further, a tambour door 244 is attached to the panels 240 with a rail arrangement to allow access to the container 38 disposed within. Although not illustrated, it will be understood that the system 236 could also include a document window 226 for holding documents.

As is considered apparent, the enclosures of FIGS. 17-18 allow the container 38 to be located between the grate 36 and the enclosure (i.e., canopy 200, rigid structure 238). The enclosure allows the containment assembly to be used in outdoor applications. Further, rain and other precipitation does not enter into the flexible bag 32, but rather passes off the enclosure and onto the ground. However, materials that have leaked from the drums or contains stored on the grate 36 would be collected in the flexible bag 32. This ensures that the bag 32 does not become prematurely filled with material that does not need to be contained.

Figure 19:
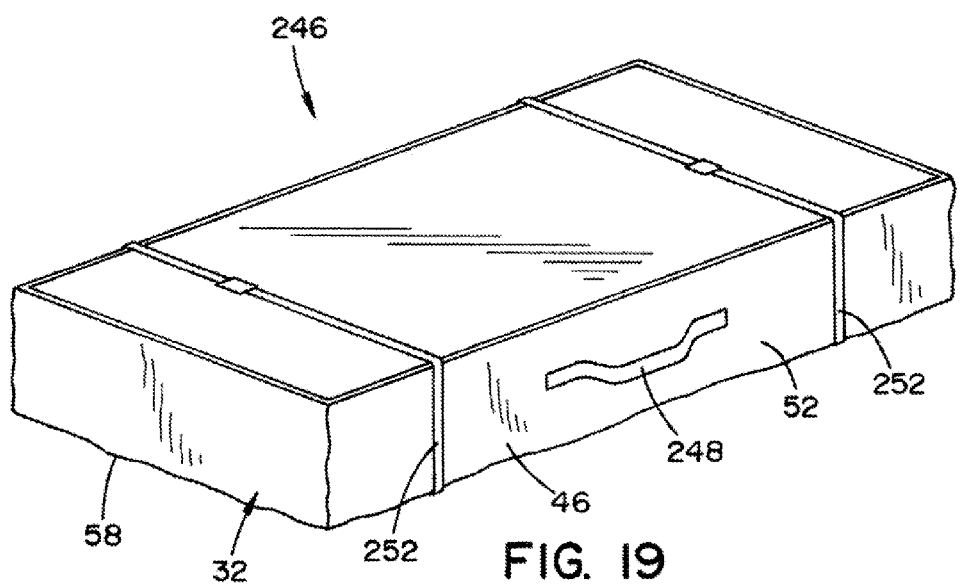
FIG. 19 is a perspective view of an alternative portable spill containment system.

With reference to FIG. 19, an alternate portable containment system 246 is shown. The system 246 can include a carrying handle 248 that is attached to the exterior surface 52 of the bag 32 at a plurality of locations so as to define a loop. The loop is adapted to be of sufficient size to allow for receipt of a human hand to aid in carrying the system 246. Additionally, a plurality of packing straps 252 may encircle the flexible bag 32. These packing straps 252 can be disposed so as to be spaced from and on opposite sides of the carrying handle 248. The straps 252 ensure that all of the components remain within the bag 32 until deployment of the system 246 is needed.

Thus, the portable containment system 246 can be shipped or stored in a compact arrangement, not unlike a suitcase, which can be transported to an assembly location and assembled to form the containment system as illustrated in the other embodiments of the present application. Notably, the pedestals 34 and/or composite pedestals 94 could be disposed within the bag 32 during shipment or storage or could be separately located. Further still, the grate(s) 36 could be received within the bag 32 illustrated in FIG. 19 during shipment or storage. Thus, the bag 32 serves to contain the various components during shipment/storage and also capture leakage from the container placed on the grate during usage.

Additionally, advantages and modifications will readily occur to those skilled in the art. Therefore, the invention in its broader aspects is not limited to the specific details and illustrative examples shown and described herein. Accordingly, various modifications may be made without departing from the scope or spirit of the general inventive concept as defined by the appended claims and their equivalence.

What is claimed is:

1. A method for protecting a ground surface from exposure to material that may be spilled from or leak from one or more containers, the method comprising:
    arranging, on the ground surface, a flexible bag having a bag bottom and a bag sidewall that cooperate to define an interior;
    interconnecting a plurality of separate and distinct first beams and a plurality of separate and distinct second beams together to form an interconnected grid structure disposed in the interior of the flexible bag;
    placing at least one perforated grate on the interconnected grid structure disposed in the interior of the flexible bag such that the at least one perforated grate is supported above the bag bottom by the interconnected grid structure; and
    placing the one or more containers of material onto the at least one perforated grate supported above the bag bottom by the interconnected grid structure disposed in the interior of the flexible bag.

2. The method according to claim 1, wherein the flexible bag is in a folded condition before the flexible bag is arranged on the ground surface, and wherein the method further comprises unfolding the flexible bag.

3. The method according to claim 2, wherein the method further comprises shipping the flexible bag in the folded condition together with the plurality of separate and distinct first beams, the plurality of separate and distinct second beams and the at least one perforated grate.

4. The method according to claim 3, wherein the plurality of separate and distinct first beams, the plurality of separate and distinct second beams and the at least one perforated grate are wrapped inside the flexible bag when the flexible bag is shipped in the folded condition.

5. A method for protecting a ground surface from exposure to material that may be spilled from or leak from one or more containers, the method comprising:
    arranging, on the ground surface, a flexible bag having a bag bottom and a bag sidewall that cooperate to define an interior;
    disposing a plurality of pedestals within the interior of the bag, each of said plurality of pedestals including a top wall with a primarily planar face, and at least one primary projection and at least one secondary projection, both of which project upwardly from the primarily planar face;
    placing at least one perforated grate on the plurality of pedestals disposed within the interior of the bag such that the at least one perforated grate rests in contact with the primarily planar face of the plurality of pedestals between the at least one primary projection and the at least one secondary projection and the at least one perforated grate is supported above the bag bottom by the plurality of pedestals; and
    placing the one or more containers of material onto the at least one perforated grate supported above the bag bottom by the plurality of pedestals disposed in the interior of the flexible bag.

6. The method according to claim 5, wherein the flexible bag is in a folded condition before the flexible bag is arranged on the ground surface, and wherein the method further comprises unfolding the flexible bag.

7. The method according to claim 6, wherein the method further comprises shipping the flexible bag in the folded condition together with the plurality of pedestals and the at least one perforated grate.

8. The method according to claim 7, wherein the plurality of pedestals and the at least one perforated grate are wrapped inside the flexible bag when the flexible bag is shipped in the folded condition.

9. The method according to claim 7, wherein the plurality of pedestals have a hollow interior and are nested together in a stack when shipped.

10. The method according to claim 5, wherein the flexible bag includes a plurality of pockets, and wherein the method further comprises inserting the primary projections of the plurality of pedestals disposed within the interior of the bag into respective pockets such that the primary projections function as hooks that hold up the bag sidewall.

* * * * *